3,038,935
PROCESS FOR THE PRODUCTION OF 3,5,3',5'-TETRA-SUBSTITUTED 4,4'-DIHYDROXY-DIPHENYL-METHYL CARBOXYLIC ACIDS

Hanns Gerber, Buderich, near Dusseldorf, and Rudolf Stroh, Leverkusen, Germany, assignors to Farbenfabriken Bayer Aktiengesellschaft, Leverkusen, Germany, a corporation of Germany
No Drawing. Filed July 1, 1959, Ser. No. 824,186
Claims priority, application Germany July 8, 1958
7 Claims. (Cl. 260—520)

This invention refers to novel compounds and is more particularly concerned with the production of 3,5,3',5'-tetra-substituted 4,4'-dihydroxy-diphenylmethyl carboxylic acids.

It is an object of the present invention to provide a process for the production of methine carboxylic acids. Another object is to provide a process for the production of 3,5,3',5' - tetra - substituted 4,4 - dihydroxy - diphenylmethyl carboxylic acids in a simple manner and with good yields. Still further objects will become apparent as the description proceeds.

These objects are accomplished by reacting alkali salts of hindered phenols in alcoholic solution at somewhat elevated temperatures with dichloracetic acid and isolating the 3,5,3',5' - tetra - substituted 4,4'-dihydroxy-diphenylmethyl carboxylic acids formed.

The reaction proceeds according to the following reaction scheme diagram:

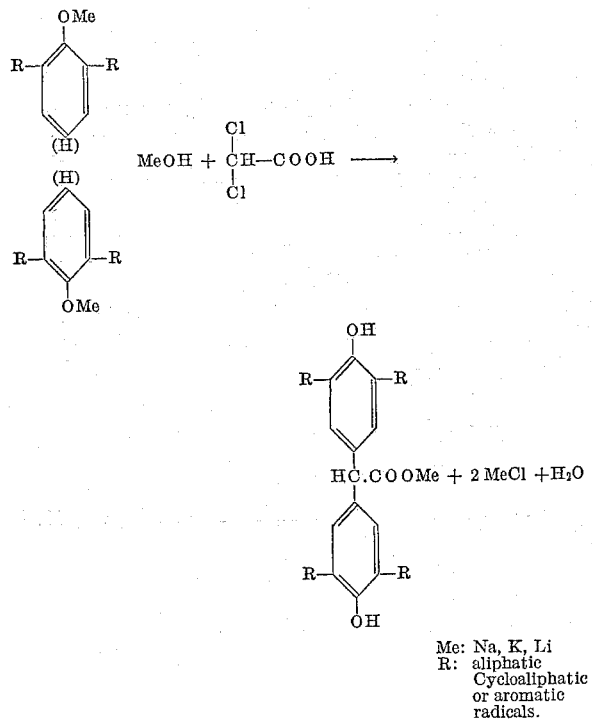

Me: Na, K, Li
R: aliphatic
    Cycloaliphatic
    or aromatic
    radicals.

By "hindered" phenols (see (Stillson et al., Journal of American Chemical Society, 67, 303 (1945)) herein, there are understood those phenols which are substituted in both o-positions by aliphatic, cycloaliphatic or aromatic groups and of which at least one is connected through a tertiary carbon atom to the phenol ring.

The following 2,6-disubstituted phenols can for example be considered for the reaction according to the invention: 2 - methyl - 6 - tert. - butyl phenol, 2,6 - di - tert.-amyl phenol, 2,6-di-cyclohexyl phenol, 2,6-diphenyl phenol, 2-tert.-butyl-6-tert.-amyl phenol, 2-tert.-butyl-6-cyclohexyl phenol.

When using the alcohols as solvents, it is on the one hand necessary to use alcohols which are able to dissolve a sufficient proportion of the alkali phenolate, and on the other permit the use of sufficiently high temperatures. Consequently, it is preferred to use methanol, ethanol, propanol and n-butanol.

The process can be carried out in two forms, which differ only by the nature of the introduction of the alkali salts of the "obstructed" phenols. In the first form of the process, the alkali phenolates are directly introduced. These are primarily the potassium and sodium phenolates, but lithium phenolate can also be considered. The dichloracetic acid is added to an alcoholic suspension or solution of these alkali phenolates. The suspension or solution of the alkali phenolates contains advantageously such an amount of alkali hydroxide which is necessary to neutralize the dichloracetic acid.

In the second form of the process, the "hindered" phenol is dissolved in an alcoholic alkali solution, the alkali phenolate being formed. It is advantageous to apply such an amount of alkali hydroxide which is necessary to form the phenolates and in addition to neutralize the dichloracetic acid. The dichloracetic acid is thereafter added.

In both forms of the process, 1 mol of dichloracetic acid is used to 2 mols of alkali phenolate. It is also possible to use an excess without any disadvantageous effect on the course of the reaction. The reaction temperature can be between room temperature and the boiling points of the reaction mixture.

The working up of the reaction mixture can take place by conventional methods, but is advantageously effected by evaporating the solvent in vacuo or precipitating the methyl carboxylic acid with a strong acid while simultaneously diluting with water.

The methyl carboxylic acids which can be produced according to the invention and which hitherto were unknown are available starting materials for the production of rubber auxiliaries, mineral oil additives and stabilisers for plastics. For example, the 4,4'-dihydroxy-3,5,3',5',-tetra-tert.-butyl diphenyl methyl carboxylic acid can be used as age-resister for plastics, especially for polycarbonates.

The invention is further disclosed in the following examples which are illustrative but not limitative thereof.

Example 1

In a stirrer-type vessel provided with a reflux condenser, 410 parts by weight of 2,6-di-tert.-butyl phenol are dissolved in 2000 parts by weight of ethyl alcohol and 250 parts by weight of potassium hydroxide, dissolved in 250 parts by weight of water, and heated to 80° C. Within one hour, 350 parts by weight of dichloracetic acid are run in. The reaction mixture is kept for 12 hours at 80° C. Thereafter, the main part of the alcohol is distilled off in vacuo at 40 to 60 mm. Hg. The residue is taken up in water, the potassium chloride dissolving and the reaction product precipitating in crystalline form. After drying, the crude acid can easily be purified by recrystallization from ligroin or cyclohexane. There are obtained 350 parts by weight of 4,4'-dihydroxy-3,5,3',5'-tetra-tert.-butyl diphenyl methyl carboxylic acid. M.P.= 211° C. (yield: 74% of the theoretical).

The methine carboxylic acid thus obtained is esterified with ethanol in the customary way forming 4,4'-dihydroxy-3,5,3',5'-tetra-tert.-butyl diphenyl methyl carboxylic acid ethyl ester.

The addition of 0.5% of this methyl carboxylic acid ester to turbine oil avoids largely the oxidation of the oil. Thus, for example, the Kröger test shows that normal turbine oil is substantially oxidized after about 40 minutes, i.e. the oxygen pressure has decreased from about 75 mm. Hg to about 0.0 mm. Hg while the same turbine oil containing 0.5% of 4,4'-dihydroxy-3,5,3',5'-tetra-tert.-butyl diphenylmethyl carboxylic acid ethyl ester is oxidized after 260 minutes and the oxygen pressure has decreased from about 75 mm. Hg to 0.0 mm. Hg in this period of time (for Kröger test compare for instance "Erdöl und Kohle," 1949, pages 389–390).

*Example 2*

488 parts by weight of the potassium salt of 2,6-di-tert.-butyl phenol are dissolved in 2000 parts by weight of alcohol and 135 parts by weight of potassium hydroxide and worked up as described in Example 1. There are obtained 360 parts by weight of 4,4'-dihydroxy-3,5,3',5'-tetra-tert.-butyl diphenylmethyl carboxylic acid=76% of the theoretical.

*Example 3*

515 parts by weight of 2,6-di-tert.-butyl phenol are suspended in 1000 parts by weight of methanol and 735 parts by weight of potassium hydroxide at 85° C. with partial dissolution by intensive stirring and kept for 3 hours at the temperature indicated. Thereafter, 645 parts by weight of dichloracetic acid dissolved in 200 parts by weight of methanol are run in within 2 hours, the temperature falling to 75° C. The reaction mixture is heated for a further 20 hours at 80° C. under reflux and while stirring. After cooling, 400 parts by weight of 30% hydrochloric acid are added and the reaction mixture diluted with 100 parts by weight of water. The 4,4' - dihydroxy - 3,5,3',5' - tetra - tert. - butyl diphenylmethyl carboxylic acid precipitates in crystalline form. After filtering with suction, the product is thoroughly washed on the filter and recrystallised from ligroin after being dried. 625 parts by weight of 4,4'-dihydroxy-3,5, 3',5'-tetra-tert.-butyl diphenylmethyl carboxylic acid are obtained (95% of the theoretical).

What we claim is:

1. Process for the production of 3,5,3',5'-tetrasubstituted 4,4'-dihydroxy-diphenylmethyl carboxylic acids, which comprises reacting one mol of an alkali metal salt of a phenol, which is a member selected from the group consisting of 2-methyl-6-tert.-butyl phenol, 2,6-di-tert.-amyl phenol, 2,6-dicyclo-hexyl phenol, 2,6-diphenyl phenol, 2-tert.-butyl-6-tert.-amyl phenol and 2-tert.-butyl-6-cyclohexyl phenol, with at least 0.5 mol of dichloro-acetic acid in the presence of an amount of an alkali metal hydroxide sufficient to convert the dichloro-acetic acid into its alkali metal salt and an alcohol which is a member selected from the group consisting of methanol, ethanol, propanol and n-butanol, and recovering the 3,5,3',5'-tetrasubstituted 4,4-dihydroxy-diphenylmethyl carboxylic acid thereby formed.

2. Process for the production of 3,5,3',5'-tetrasubstituted 4,4'-dihydroxy-diphenylmethyl carboxylic acids, which comprises reacting a phenol, which is a member selected from the group consisting of 2-methyl-6-tert.-butyl phenol, 2,6-di-tert.-amyl phenol, 2,6-dicyclohexyl phenol, 2,6-diphenyl phenol, 2-tert.-butyl-6-tert.-amyl phenol and 2-tert.-butyl-6-cyclohexyl phenol, with at least 0.5 mol of dichloro-acetic acid in the presence of an amount of an alkali metal hydroxide sufficient to convert said phenol and said dichloro-acetic acid into their alkali metal salts and an alcohol which is a member selected from the group consisting of methanol, ethanol, propanol and n-butanol, and recovering the 3,5,3',5' - tetrasubstituted 4,4'-dihydroxy-diphenylmethyl carboxylic acid thereby formed.

3. Process according to claim 1, wherein said reaction is effected at a temperature of between room temperature and the boiling point of the reaction mixture.

4. Process according to claim 1, wherein the amount of alkali metal hydroxide employed is in excess of the amount required to convert the dichloro-acetic acid into its alkali metal salt.

5. Process according to claim 1, wherein said 3,5,3',5'-tetrasubstituted 4,4'-dihydroxy-diphenylmethyl carboxylic acid is recovered by diluting the reaction mixture with water and thereafter acidifying the reaction mixture.

6. Process for the production of 3,5,3',5'-tetra-tert.-butyl-4,4'-dihydroxy-diphenylmethyl carboxylic acid, which comprises dissolving at a temperature of about 80° C. one mol of 2,6-di-tert.-butyl phenol in at least about twice its amount by weight of ethanol in the presence of at least 2 mols of potassium hydroxide, adding gradually more than ½ mol of dichloro-acetic acid, maintaining the reaction mixture at the same temperature for 12 more hours, and recovering the 3,5,3',5'-tetra-tert.-butyl-4,4'-dihydroxy-diphenylmethyl carboxylic acid thereby formed by adding a mineral acid to the reaction mixture diluted with water.

7. Process for the production of 3,5,3',5'-tetra-tert.-butyl-4,4'-dihydroxy-diphenylmethyl carboxylic acid, which comprises suspending at a temperature of about 85° C. one mol of 2,6-di-tert.-butyl phenol in about twice its amount by weight of methanol in the presence of at least 5 mols of potassium hydroxide, adding gradually at least 2 mols of dichloro-acetic acid, maintaining the reaction mixture at the same temperature for 20 more hours, and recovering the 3,5,3',5'-tetra-tert.-butyl-4,4-dihydroxy-diphenylmethyl carboxylic acid thereby formed by adding a mineral acid to the reaction mixture diluted with water.

References Cited in the file of this patent

UNITED STATES PATENTS 2,903,487     Coffield _____ Sept. 8, 1959